United States Patent
Zhang

(10) Patent No.: US 11,225,260 B2
(45) Date of Patent: Jan. 18, 2022

(54) CONTROL METHOD AND DEVICE FOR AUTOMATED GUIDED VEHICLE, AND AUTOMATED GUIDED VEHICLE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Qiang Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 233 days.

(21) Appl. No.: 16/491,101

(22) PCT Filed: Dec. 27, 2017

(86) PCT No.: PCT/CN2017/119009
§ 371 (c)(1),
(2) Date: Sep. 4, 2019

(87) PCT Pub. No.: WO2018/176945
PCT Pub. Date: Oct. 4, 2018

(65) Prior Publication Data
US 2020/0017113 A1    Jan. 16, 2020

(30) Foreign Application Priority Data

Mar. 28, 2017 (CN) .......................... 201710189771.3

(51) Int. Cl.
*B60W 50/00* (2006.01)
*B60W 30/18* (2012.01)
(Continued)

(52) U.S. Cl.
CPC ............ *B60W 50/00* (2013.01); *B60W 30/18* (2013.01); *G05D 1/0088* (2013.01); *G05D 1/021* (2013.01);
(Continued)

(58) Field of Classification Search
CPC .. B60W 50/00; B60W 30/18; B60W 2556/00; B60W 2520/28; B60W 2520/30;
(Continued)

(56) References Cited

U.S. PATENT DOCUMENTS 4,498,038 A * 2/1985 Malueg .................. B64D 47/08
248/550
6,263,160 B1 * 7/2001 Lewis ..................... G03B 15/00
248/550
(Continued)

FOREIGN PATENT DOCUMENTS

CN    101604172 A    12/2009
CN    201741038 U    2/2011
(Continued)

OTHER PUBLICATIONS

International Search Report dated Mar. 14, 2018 in PCT/CN2017/119009 filed on Dec. 27, 2017.
(Continued)

*Primary Examiner* — Peter D Nolan
*Assistant Examiner* — Peter Y Ning
(74) *Attorney, Agent, or Firm* — Oblon, McClelland, Maier & Neustadt, L.L.P.

(57) ABSTRACT

The present disclosure discloses a control method and device for automated guided vehicle, and automated guided vehicle. By utilizing the coupling relation between the turntable and the chassis, a disturbance to the chassis electromechanical control subsystem is compensated by using a feedback signal in the turntable electromechanical control
(Continued)

subsystem, or a disturbance to the turntable electromechanical control subsystem is compensated by using a feedback signal in the chassis electromechanical control subsystem, so that high-precision movement control of the turntable and the chassis is realized.

17 Claims, 7 Drawing Sheets

(51) Int. Cl.
  *G05D 1/00* (2006.01)
  *G05D 1/02* (2020.01)
(52) U.S. Cl.
  CPC ..... *B60W 2520/28* (2013.01); *B60W 2520/30* (2013.01); *B60W 2556/00* (2020.02)
(58) Field of Classification Search
  CPC ............... G05D 1/0088; G05D 1/021; G05D 2201/0216; G05D 1/0223; G05D 13/62
  See application file for complete search history.

(56) References Cited

U.S. PATENT DOCUMENTS

| | | | | |
|---|---|---|---|---|
| 6,273,237 | B1 * | 8/2001 | Bazydola | B65G 47/244 |
| | | | | 198/375 |
| 7,350,613 | B2 * | 4/2008 | Dehne | B62D 65/18 |
| | | | | 180/167 |
| 7,392,120 | B2 * | 6/2008 | Matsumoto | B60T 8/17557 |
| | | | | 180/168 |
| 7,740,099 | B2 * | 6/2010 | Field | B60G 17/016 |
| | | | | 180/282 |
| 10,806,538 | B2 * | 10/2020 | Farritor | A61B 90/361 |
| 2016/0202704 | A1 * | 7/2016 | Hoheisel | B64B 1/48 |
| | | | | 701/4 |
| 2019/0264864 | A1 * | 8/2019 | Chen | F16M 11/10 |

FOREIGN PATENT DOCUMENTS

| | | |
|---|---|---|
| CN | 202499280 U | 10/2012 |
| CN | 104326242 A | 2/2015 |
| CN | 104386400 A | 3/2015 |
| CN | 105242668 A | 1/2016 |
| CN | 105571589 A | 5/2016 |
| CN | 106003039 A | 10/2016 |
| CN | 106527447 A | 3/2017 |
| CN | 106909155 A | 6/2017 |
| JP | 2013-184537 A | 9/2013 |
| JP | 2013-249008 A | 12/2013 |

OTHER PUBLICATIONS

Office Action dated Jul. 16, 2021 in Indian Patent Application No. 201937037585.

* cited by examiner

CONTROL METHOD AND DEVICE FOR AUTOMATED GUIDED VEHICLE, AND AUTOMATED GUIDED VEHICLE

CROSS-REFERENCE TO RELATED APPLICATIONS

The present disclosure is based on and claims priority of Chinese patent application No. 201710189771.3, filed on Mar. 28, 2017, which is hereby incorporated into this disclosure by reference in its entirety.

TECHNICAL FIELD

The present disclosure relates to the field of automatic control, and particularly to a control method, device for an automated guided vehicle and an automated guided vehicle.

BACKGROUND

Automated Guided Vehicle (AGV) refers to a wheeled mobile robot equipped with sensors such as vision and laser radar, which can automatically travel along a specified path and have functions such as autonomous obstacle avoidance and goods carrying. In recent years, with the rapid development of international and domestic logistics and e-commerce industries, there is great demand for AGVs in application scenarios such as intelligent unmanned storage and unmanned delivery.

Current AGVs have two independent control subsystems, a chassis electromechanical control subsystem for controlling the rotational angular velocity of a chassis and a turntable electromechanical control subsystem for controlling the rotational angular velocity of a turntable.

During the turning of an AGV along the planned path, it is required to drive the turntable to rotate in a direction opposite to the direction of rotation of the AGV to maintain in real time a rotational angular velocity of the turntable (denoted as $\omega_g$) that is equal to the rotational angular velocity of the chassis (denoted as $\omega_c$) in opposite direction, that is, $\omega_g(t)=-w_c(t)$ is satisfied at all times, so as to keep the spatial orientation of the carried goods unchanged, thereby realizing tasks of correct warehousing and ex-warehousing of the goods.

In order to achieve this goal, in the related art, it is necessary to plan a rotational acceleration/deceleration trajectory, and then design closed-loop control systems for a turntable motor and a chassis drive motor respectively, so as to achieve planned-trajectory tracking by the motors respectively. In the ideal case without tracking error, accurate synchronization can be theoretically achieved for the turntable.

SUMMARY

Some embodiments of the present disclosure provide a control method and device for an automated guided vehicle and an automated guided vehicle. By utilizing the coupling relation between the turntable and the chassis, a disturbance to the chassis electromechanical control subsystem is compensated by using a feedback signal in the turntable electromechanical control subsystem, or a disturbance to the turntable electromechanical control subsystem is compensated by using a feedback signal in the chassis electromechanical control subsystem, so that high-precision movement control of the turntable and the chassis is realized.

According to an aspect of the present disclosure, there is provided a control method for an AGV, comprising:

determining a first compensation voltage according to a feedback signal in a first control subsystem;

compensating for a disturbance to a second control subsystem by using the first compensation voltage;

wherein the first control subsystem is one of a turntable electromechanical control subsystem and a chassis electromechanical control subsystem, and the second control subsystem is the other of the turntable electromechanical control subsystem and the chassis electromechanical control subsystem.

In some embodiments, compensating for a disturbance to a second control subsystem comprises: compensating for an input voltage of an electromechanical module in the second control subsystem by using the first compensation voltage.

In some embodiments, the chassis has a plurality of drive wheels, and the first compensation voltage comprises a compensation voltage of each drive wheel, wherein compensating for a disturbance to a second control subsystem comprises: compensating for an input voltage of an electromechanical module of each drive wheel in the chassis electromechanical control subsystem using the compensation voltage of the drive wheel.

In some embodiments, the first control subsystem is a turntable electromechanical control subsystem, and the second control subsystem is a chassis electromechanical control subsystem, and determining a first compensation voltage comprises:

determining an induction torque $\tau_g$ according to a feedback signal in the turntable electromechanical control subsystem;

determining a torque $\tau_w$ applied to drive wheels of the chassis by the turntable according to the induction torque $\tau_g$;

determining a compensation voltage u of each drive wheel of the chassis based on the torque $\tau_w$ and a rotational angular velocity of the drive wheel.

In some embodiments, the feedback signal in the turntable electromechanical control subsystem is a turntable rotational angular velocity $\omega_g$; the induction torque $\tau_g$ is directly proportional to a turntable rotational angular acceleration $d\omega_g/dt$.

In some embodiments, the torque $\tau_w$ is directly proportional to the induction torque $\tau_g$.

In some embodiments, the chassis has a left drive wheel and a right drive wheel, the compensation voltage $u_l$ of the left drive wheel being opposite to the compensation voltage $u_r$ of the right drive wheel.

In some embodiments, the first control subsystem is a chassis electromechanical control subsystem, and the second control subsystem is a turntable electromechanical control subsystem, wherein determining a first compensation voltage comprises:

determining an absolute angular velocity $\omega_c$ of rotation of the chassis according to a feedback signal in the chassis electromechanical control subsystem;

determining a torque $\tau_c$ applied to the turntable by the chassis according to an absolute angular acceleration $d\omega_c/dt$ of rotation of the chassis;

determining a turntable compensation voltage $u_g$ according to the torque $\tau_c$ and a rotational angular velocity $\omega_g$ of the turntable.

In some embodiments, the chassis has a left drive wheel and a right drive wheel, and the feedback signal in the chassis electromechanical control subsystem comprises a right drive wheel rotational angular velocity $\omega_r$ and a left drive wheel rotational angular velocity $\omega_l$ in the chassis electromechanical control subsystem;

the absolute angular velocity $\omega_c$ is directly proportional to a difference between the right drive wheel rotational angular velocity $\omega_r$ and the left drive wheel rotational angular velocity $\omega_l$.

In some embodiments, the torque $\tau_c$ is directly proportional to the absolute angular acceleration $d\omega_c/dt$ of rotation of the chassis.

In some embodiments, the control method further comprises:

determining a second compensation voltage according to a feedback signal in a second control subsystem;

compensating for a disturbance to the first control subsystem by using the second compensation voltage.

According to another aspect of the present disclosure, a control device for an automated guided vehicle is provided, comprising:

a first compensation voltage determination module for determining a first compensation voltage according to a feedback signal in a first control subsystem; and a first disturbance compensation module for compensating for a disturbance to a second control subsystem by using the first compensation voltage;

wherein the first control subsystem is one of a turntable electromechanical control subsystem and a chassis electromechanical control subsystem, and the second control subsystem is the other of the turntable electromechanical control subsystem and the chassis electromechanical control subsystem.

In some embodiments, the first disturbance compensation module is used to compensate for an input voltage of an electromechanical module in the second control subsystem by using the first compensation voltage.

In some embodiments, the chassis has a plurality of drive wheels, and the first compensation voltage comprises a compensation voltage of each drive wheel; the first disturbance compensation module is used to compensate for an input voltage of an electromechanical module of each drive wheel in the chassis electromechanical control subsystem by using the compensation voltage of the drive wheel.

In some embodiments, the first control subsystem is a turntable electromechanical control subsystem, and the second control subsystem is a chassis electromechanical control subsystem, the first compensation voltage determination module comprising:

an induction torque determination unit for determining an induction torque $\tau_g$ according to a feedback signal in the turntable electromechanical control subsystem;

a turntable torque determination unit for determining a torque $\tau_w$ applied to the chassis drive wheels by the turntable according to the induction torque $\tau_g$; and a compensation voltage determination unit for determining a compensation voltage u of each drive wheel of the chassis based on the torque $\tau_g$ and a rotational angular velocity of the drive wheel.

In some embodiments, the feedback signal in the turntable electromechanical control subsystem is a turntable rotational angular velocity $\omega_g$; the induction torque $\tau_g$ is directly proportional to a turntable rotational angular acceleration $d\omega_g/dt$.

In some embodiments, the torque $\tau_w$ is directly proportional to the induction torque $\tau_g$.

In some embodiments, the chassis has a left drive wheel and a right drive wheel, the compensation voltage $u_l$ of the left drive wheel being opposite to the compensation voltage $u_r$ of the right drive wheel.

In some embodiments, the first control subsystem is a chassis electromechanical control subsystem, and the second control subsystem is a turntable electromechanical control subsystem, the first compensation voltage determination module comprising:

an absolute angular velocity determination unit for determining an absolute angular velocity $\omega_c$ of rotation of the chassis according to a feedback signal in the chassis electromechanical control subsystem;

a chassis torque determination unit for determining a torque $\tau_c$ applied to the turntable by the chassis according to an absolute angular acceleration $d\omega_c/dt$ of rotation of the chassis;

a turntable compensation voltage determination unit for determining a turntable compensation voltage $u_g$ according to the torque $\tau_c$ and a rotational angular velocity $\omega_g$ of the turntable.

In some embodiments, the chassis has a left drive wheel and a right drive wheel, and the feedback signal in the chassis electromechanical control subsystem comprises a right drive wheel rotational angular velocity $\omega_r$ and a left drive wheel rotational angular velocity $\omega_l$ in the chassis electromechanical control subsystem; the absolute angular velocity $\omega_c$ is directly proportional to a difference between the right drive wheel rotational angular velocity $\omega_r$ and the left drive wheel rotational angular velocity $\omega_l$.

In some embodiments, the torque $\tau_c$ is directly proportional to the absolute angular acceleration $d\omega_c/dt$ of rotation of the chassis.

In some embodiments, the control device further comprises:

a second compensation voltage determination module for determining a second compensation voltage according to a feedback signal in a second control subsystem; and a second disturbance compensation module for compensating for a disturbance to a first control subsystem by using the second compensation voltage.

According to another aspect of the present disclosure, a control device for an automated guided vehicle is provided, comprising:

memory for storing computer instructions;

a processor coupled to the memory, which is configured to carry out the control method according to any one of the above embodiments based on computer instructions stored in the memory.

According to another aspect of the present disclosure, an automated guided vehicle is provided, comprising the control device for an automated guided vehicle according to any one of the above embodiments.

According to a still another aspect of the present disclosure, a computer-readable storage medium having stored therein computer instructions that, when executed by one or more processors, implement the control method according to any one of the above embodiments is provided.

Other features and advantages of the present disclosure will become apparent from the following detailed description of exemplary embodiments of the present disclosure with reference to the accompanying drawings.

BRIEF DESCRIPTION OF THE DRAWINGS

In order to more clearly explain the embodiments of the present disclosure or the technical solutions in the prior art, a brief introduction will be given below for the drawings required to be used in the description of the embodiments or the prior art. It is obvious that, the drawings illustrated as follows are merely some of the embodiments of the present disclosure. For a person skilled in the art, he or she may also acquire other drawings according to such drawings on the premise that no inventive effort is involved.

DETAILED DESCRIPTION

Figure 1:
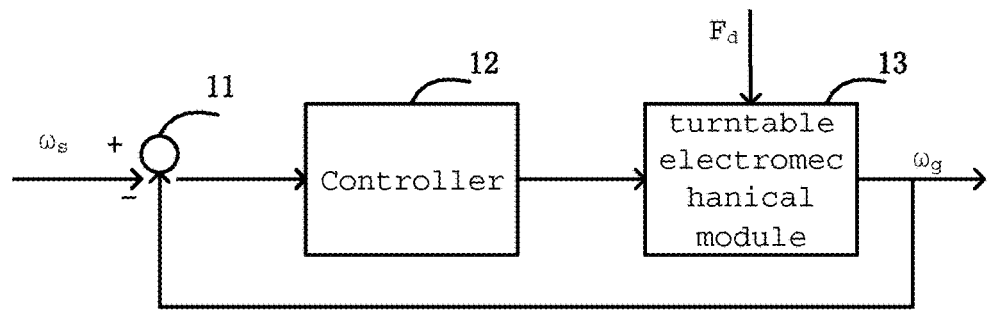
FIG. 1 is a schematic diagram of a turntable electromechanical control subsystem.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by persons of ordinary skill in the art based on the embodiments of the present disclosure without creative efforts shall fall within the protection scope of the present disclosure.

Unless otherwise specified, the relative arrangement, numerical expressions and numerical values of the components and steps set forth in these examples do not limit the scope of the invention.

At the same time, it should be understood that the dimensions of the various parts shown in the drawings are not drawn to actual proportions for ease of description.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an item is defined in a drawing, there is no need for further discussion in the accompanying drawings.

FIG. 1 is a schematic diagram of a turntable electromechanical control subsystem. As shown in FIG. 1, the closed-loop control scheme of the turntable electromechanical control subsystem comprises: outputting by a subtractor 11 a difference between a given rotational angular velocity $\omega_s$ and a feedback turntable rotational angular velocity $\omega_g$, performing a control process by a controller 12 according to the difference to obtain a control voltage, and providing the control voltage to the turntable electromechanical module 13, determining a turntable rotational angular velocity $\omega_g$ using the control voltage, and returning the generated turntable rotational angular velocity $\omega_g$ to the subtractor 11 as a feedback signal.

Figure 2:
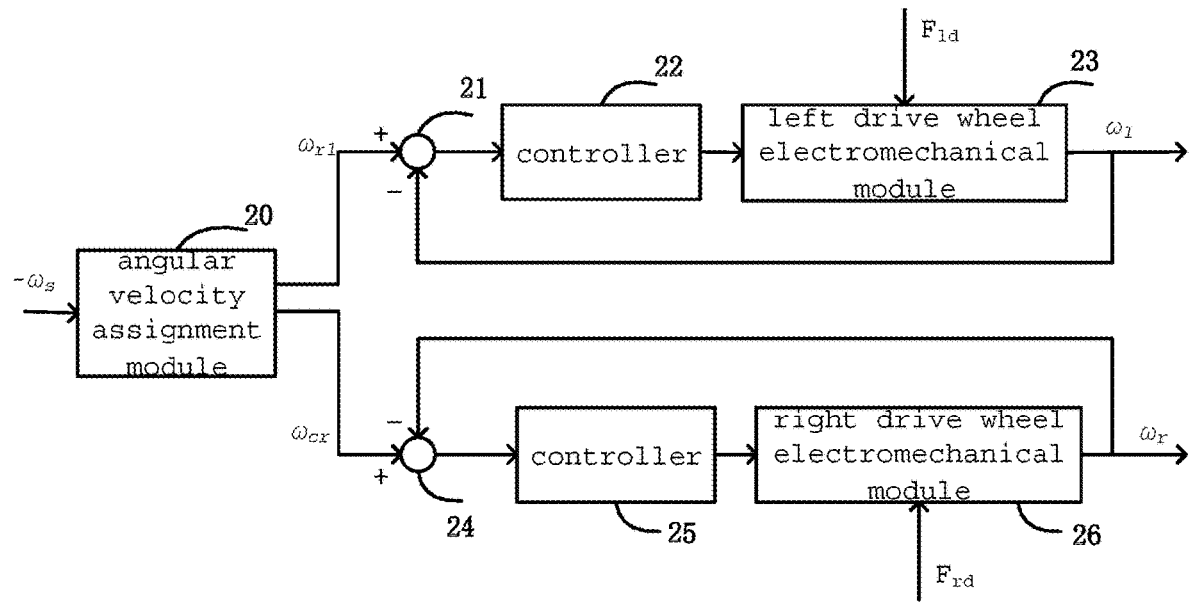
FIG. 2 is a schematic diagram of a chassis electromechanical control subsystem.

FIG. 2 is a schematic diagram of a chassis electromechanical control subsystem. As shown in FIG. 2, the closed-loop control scheme of the chassis electromechanical control subsystem comprises: according to a given rotational angular velocity—$\omega_s$, providing by an angular velocity assignment module 20 a rotational angular velocity $\omega_{rl}$ for a left-drive control branch, and providing a rotational angular velocity $\omega_{cr}$ for a right-drive control branch. $\omega_{rl}$ and $\omega_{cr}$ are opposite to each other; in the left drive control branch, outputting by a subtractor 21 a difference between the rotational angular velocity $\omega_{rl}$ and a feedback left drive wheel rotational angular velocity $\omega_l$, performing a control process by a controller 22 based on the difference to obtain a control voltage, and providing the control voltage to a left drive wheel electromechanical module 23, determining a left drive wheel rotational angular velocity $\omega_l$ using the control voltage, and returning the determined left drive wheel rotational angular velocity $\omega_l$ to the subtractor 21 as a feedback signal; in the right drive control branch, outputting by a subtractor 24 a difference between the rotational angular velocity $\omega_{cr}$ and a feedback right drive wheel rotational angular velocity $\omega_r$, and performing by a controller 25 a control process based on the difference to obtain a control voltage, and supplying the control voltage to a right drive wheel electromechanical module 26, determining a right drive wheel rotational angular velocity $\omega_r$ using the control voltage, and returning the determined right drive wheel rotational angular velocity $\omega_l$ to the subtractor 24 as a feedback signal.

Figure 3:
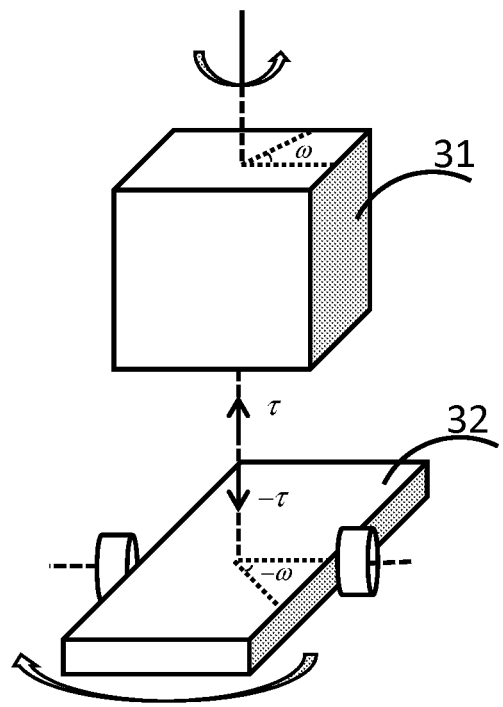
FIG. 3 is a schematic diagram of the rotation of load and chassis in an AGV of the present disclosure.

In FIG. 1, the disturbance $F_d$ experienced by the turntable electromechanical module 13 comprises a load disturbance and a chassis disturbance. In FIG. 2, each of the disturbance $F_{ld}$ experienced by the left drive wheel electromechanical module 23 and the disturbance $F_{rd}$ experienced by the right drive wheel electromechanical module 26 comprises a turntable disturbance and a ground friction disturbance. Specifically, as shown in FIG. 3, in the AGV, the motion of the load 31 and the motion of the chassis 32 are coupled to each other based on a force relation, and the generated torques are $\tau$ and $-\tau$, respectively. The forces in this coupling are represented as the disturbance terms $F_d$, $F_{ld}$ and $F_{rd}$ in FIGS. 1 and 2.

The inventors have recognized that turntable control and chassis control are independently implemented in the related art. In this way, since the mutual coupling influence between the turntable and the chassis is ignored, it is difficult to effectively eliminate corresponding disturbance terms, and it is difficult to achieve high-precision control.

A control method for an AGV is provided according to some embodiments of the present disclosure, comprising: determining a first compensation voltage according to a feedback signal in a first control subsystem; compensating for a disturbance to a second control subsystem by using the first compensation voltage; wherein the first control subsystem is one of a turntable electromechanical control subsystem and a chassis electromechanical control subsystem, and the second control subsystem is the other of the turntable electromechanical control subsystem and the chassis electromechanical control subsystem.

The above control method may further comprise: determining a second compensation voltage according to a feedback signal in a second control subsystem; compensating for a disturbance to the first control subsystem by using the second compensation voltage.

A scheme of compensating for a disturbance to the chassis electromechanical control subsystem using a feedback signal in the turntable electromechanical control subsystem and a scheme of compensating for a disturbance to the turntable electromechanical control subsystem using a feedback signal in the chassis electromechanical control subsystem will be described below with reference to FIGS. 4-6 and 7-8, respectively.

Figure 4:
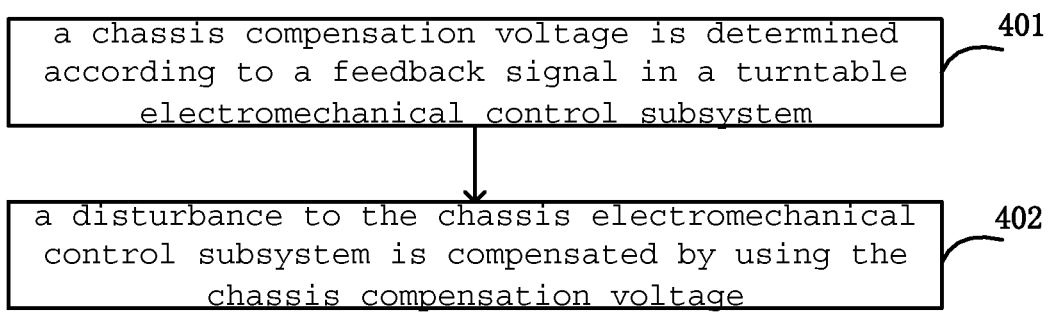
FIG. 4 is a schematic diagram of a control method for an AGV according to some embodiments of the present disclosure.

FIG. 4 is a schematic diagram of a control method for an AGV according to some embodiments of the present disclosure. The method of this embodiment comprises steps 401-402.

At step 401, a chassis compensation voltage is determined according to a feedback signal in a turntable electromechanical control subsystem.

At step 402, a disturbance to the chassis electromechanical control subsystem is compensated by using the chassis compensation voltage.

In some embodiments, an input voltage of an electromechanical module in the chassis electromechanical control subsystem is compensated by using the chassis compensation voltage. In a case where the chassis has a plurality of drive wheels, the input voltage of the electromechanical module of each drive wheel in the chassis electromechanical control subsystem is compensated by using the compensation voltage of the drive wheel. That is, the rotational angular velocity of each of the drive wheels is controlled separately.

In some embodiments, in the case where the chassis has a left drive wheel and a right drive wheel, the chassis compensation voltage comprises a compensation voltage of the left drive wheel and a compensation voltage of the right drive wheel. Optionally, the above step of a disturbance to the chassis electromechanical control subsystem is compensated by using the chassis compensation voltage may comprise: compensating for an input voltage of the left drive wheel electromechanical module in the chassis electromechanical control subsystem by using a compensation voltage of the left drive wheel; compensating for an input voltage of the right drive wheel electromechanical module in the chassis electromechanical control subsystem by using a compensation voltage of the right drive wheel. That is, the rotational angular velocities of left and right drive wheels are controlled separately.

Based on the control method for an automated guided vehicle provided in the above embodiment of the present disclosure, through utilizing the coupling relation between the turntable and the chassis, a disturbance to the chassis electromechanical control subsystem is compensated by using a feedback signal in the turntable electromechanical control subsystem, so that high-precision movement control of the turntable and the chassis is realized.

Figure 5:
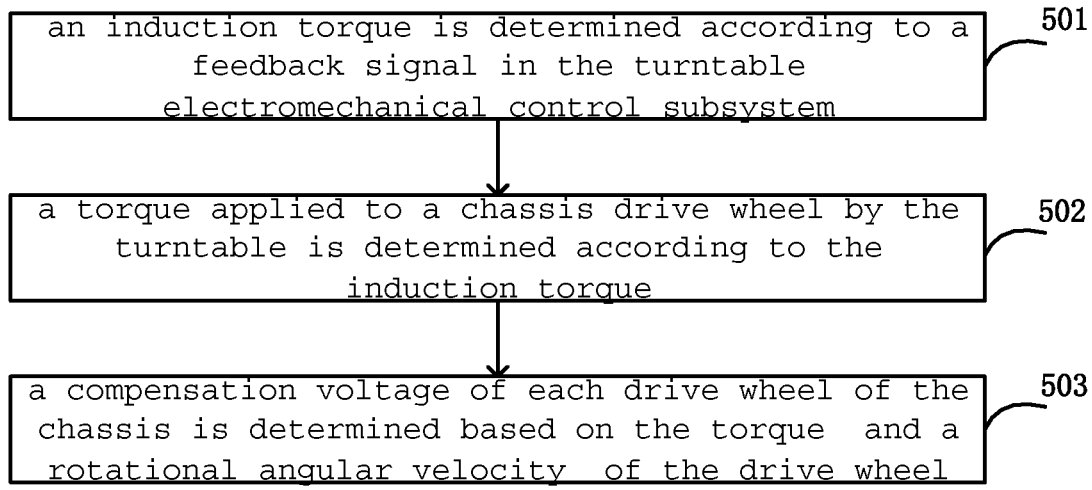
FIG. 5 is a schematic diagram of a control method for an AGV according to other embodiments of the present disclosure.

FIG. 5 is a schematic diagram of a control method for an AGV according to other embodiments of the present disclosure. In some embodiments, the step of a chassis compensation voltage is determined based on a feedback signal in the turntable electromechanical control subsystem may comprise steps 501-503.

At step 501, an induction torque $\tau_g$ is determined according to a feedback signal in the turntable electromechanical control subsystem.

In some embodiments, the feedback signal in the turntable electromechanical control subsystem is a rotational angular velocity $\omega_g$ of the turntable.

Optionally, the induction torque $\tau_g$ is directly proportional to a rotational angular acceleration $d\omega_g/dt$ of the turntable. For example, the induction torque $\tau_g$ can be calculated using the following formula (1):

$$\tau_g = \frac{J_g J_c}{J_g + J_c} \frac{d\omega_g}{dt} \tag{1}$$

where $J_g$ is the moment of inertia of the load and $J_c$ is the moment of inertia of the chassis.

At step 502, a torque $\tau_w$ applied to a chassis drive wheel by the turntable is determined according to the induction torque $\tau_g$.

Figure 6:
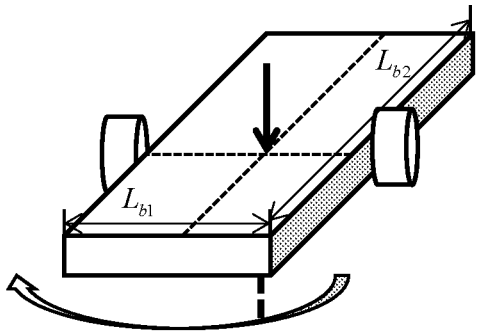
FIG. 6 is a schematic diagram of a chassis according to some embodiments of the present disclosure.

In some embodiments, the torque $\tau_w$ is directly proportional to the induction torque $\tau_g$. For example, the torque $\tau_w$ can be calculated using the following formula (2):

$$\tau_w = -\frac{\tau_g}{l_{c1}} r_w \tag{2}$$

where, $r_w$ is a wheel radius and $l_{c1}$ is the length of one side of the chassis, as shown in FIG. 6 $l_{c1}=l_{b1}$.

At step 503, a compensation voltage u of each drive wheel of the chassis is determined based on the torque $\tau_w$ and a rotational angular velocity $\omega$ of the drive wheel. For example, in a case where the chassis has, for example, a left drive wheel and a right drive wheel, a compensation voltage $u_l$ of the left drive wheel is determined according to the torque $\tau_w$ and the rotational angular velocity $\omega$ of the left drive wheel, and a compensation voltage $u_r$ of the right drive wheel is determined according to the torque $\tau_w$ and the rotational angular velocity $\omega_r$ of the right drive wheel.

Optionally, this calculation can be performed using the following formula (3) and formula (4):

$$u_r = -R_r \tau_w + K_r \omega_r \tag{3}$$

$$u_l = -R_l \tau_w + K_l \omega_l \tag{4}$$

wherein $R_r$ and $R_l$ are resistance parameters, and $K_r$ and $K_l$ are voltage parameters.

In some embodiments, the torque $\tau_w$ of the left and right drive wheels are opposite to each other, the rotational angular velocity $\omega_l$ of the left drive wheel and the rotational angular velocity $\omega_r$ of the right drive wheel are opposite to each other, and therefore, the compensation voltage $u_l$ of the left drive wheel and the compensation voltage $u_r$ of the right drive wheel are opposite to each other.

Figure 7:
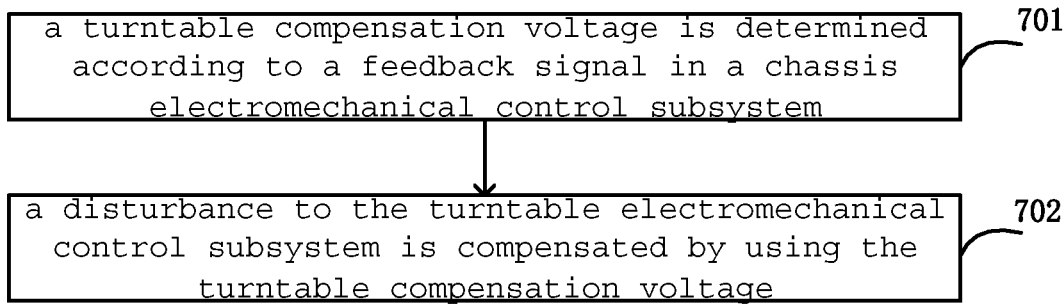
FIG. 7 is a schematic diagram of a control method for an AGV according to still other embodiments of the present disclosure.

FIG. 7 is a schematic diagram of a control method for an AGV according to still other embodiments of the present disclosure. The method of this embodiment comprises steps 701-702.

At step 701, a turntable compensation voltage is determined according to a feedback signal in a chassis electromechanical control subsystem;

At step 702, a disturbance to the turntable electromechanical control subsystem is compensated by using the turntable compensation voltage.

In some embodiments, a disturbance to the turntable electromechanical control subsystem is compensated by using the turntable compensation voltage may comprise: compensating for an input voltage of a turntable electromechanical module in the turntable electromechanical control subsystem by using the turntable compensation voltage. That is, compensation control to the turntable electromechanical control subsystem can be performed by using a feedback signal in the chassis electromechanical control subsystem.

Figure 8:
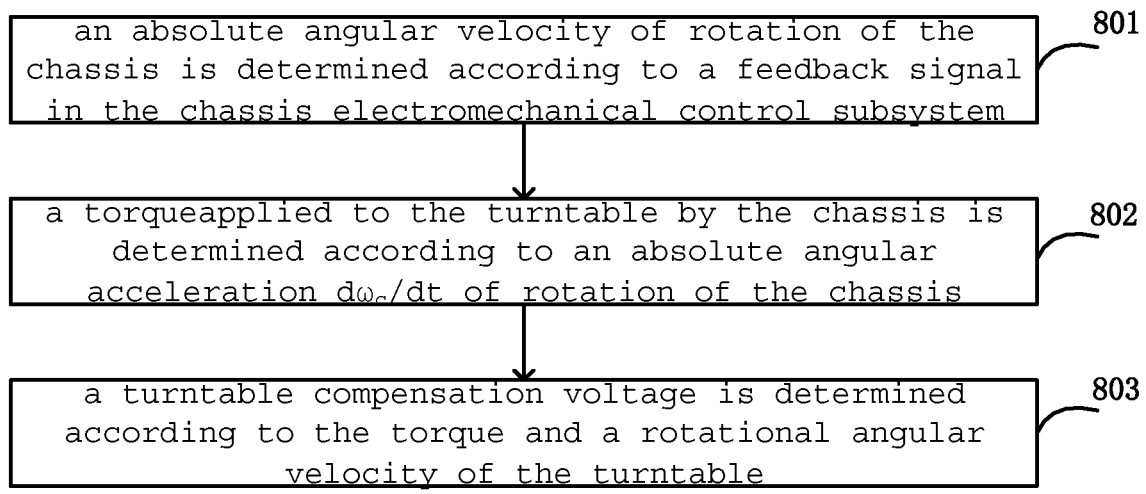
FIG. 8 is a schematic diagram of a control method for an AGV according to further embodiments of the present disclosure.

FIG. 8 is a schematic diagram of a control method for an AGV according to further embodiments of the present disclosure. In some embodiments, the step of a turntable compensation voltage is determined based on a feedback signal in the chassis electromechanical control subsystem may comprise steps 801-803.

At step 801, an absolute angular velocity $\omega_c$ of rotation of the chassis is determined according to a feedback signal in the chassis electromechanical control subsystem.

In some embodiments, the feedback signal in the chassis electromechanical control subsystem comprises a right drive wheel rotational angular velocity $\omega_r$ and a left drive wheel rotational angular velocity $\omega_l$ in the chassis electromechanical control subsystem.

Optionally, the absolute angular velocity $\omega_c$ is directly proportional to a difference between the right drive wheel rotational angular velocity $\omega_r$ and the left drive wheel rotational angular velocity $\omega_l$. For example, the absolute angular velocity $\omega_c$ can be calculated by the following formula (5):

$$\omega_c = \frac{r_w \omega_r - r_w \omega_l}{l_{c1}} \quad (5)$$

At step 802, a torque $\tau_c$ applied to the turntable by the chassis is determined according to an absolute angular acceleration $d\omega_c/dt$ of rotation of the chassis.

Optionally, the torque $\tau_c$ is directly proportional to the absolute angular acceleration $d\omega_c/dt$ of rotation of the chassis. For example, the torque $\tau_c$ can be calculated using the following formula (6):

$$\tau_c = J_g \frac{d\omega_c}{dt} \quad (6)$$

At step 803, a turntable compensation voltage $u_g$ is determined according to the torque $\tau_c$ and a rotational angular velocity $\omega_g$ of the turntable.

Optionally, this calculation can be performed using the following formula (7):

$$u_g = R_g \tau_w + K_g \omega_g \quad (7)$$

wherein $R_g$ is the resistance parameter and $K_g$ is the voltage parameter.

Furthermore, the scheme of compensating for a disturbance to the chassis electromechanical control subsystem using a feedback signal in the turntable electromechanical control subsystem can be combined with the scheme of compensating for a disturbance to the turntable electromechanical control subsystem using a feedback signal in the chassis electromechanical control subsystem to control the automated guided vehicle. For example, steps 401-402 can be executed in addition to the execution of steps 701-702, so that high-precision movement control of the turntable and the chassis is realized.

A control device for an AGV is further provided according to some embodiments of the present disclosure, comprising:

a first compensation voltage determination module for determining a first compensation voltage according to a feedback signal in a first control subsystem; and a first disturbance compensation module for compensating for a disturbance to a second control subsystem by using the first compensation voltage;

wherein the first control subsystem is one of a turntable electromechanical control subsystem and a chassis electromechanical control subsystem, and the second control subsystem is the other of the turntable electromechanical control subsystem and the chassis electromechanical control subsystem.

The above control device may further comprise:

a second compensation voltage determination module for determining a second compensation voltage according to a feedback signal in a second control subsystem; and a second disturbance compensation module for compensating for a disturbance to a first control subsystem by using the second compensation voltage.

The above control device will be described in detail below with reference to FIGS. 9-12.

Figure 9:
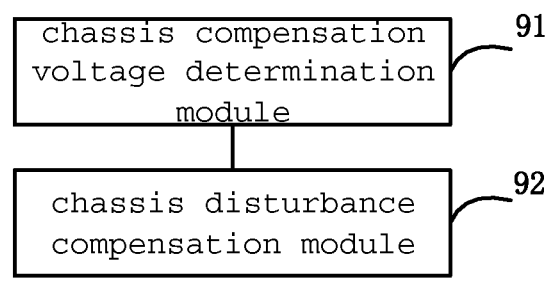
FIG. 9 is a schematic diagram of a control device for an AGV according to some embodiments of the present disclosure.
Figure 10:
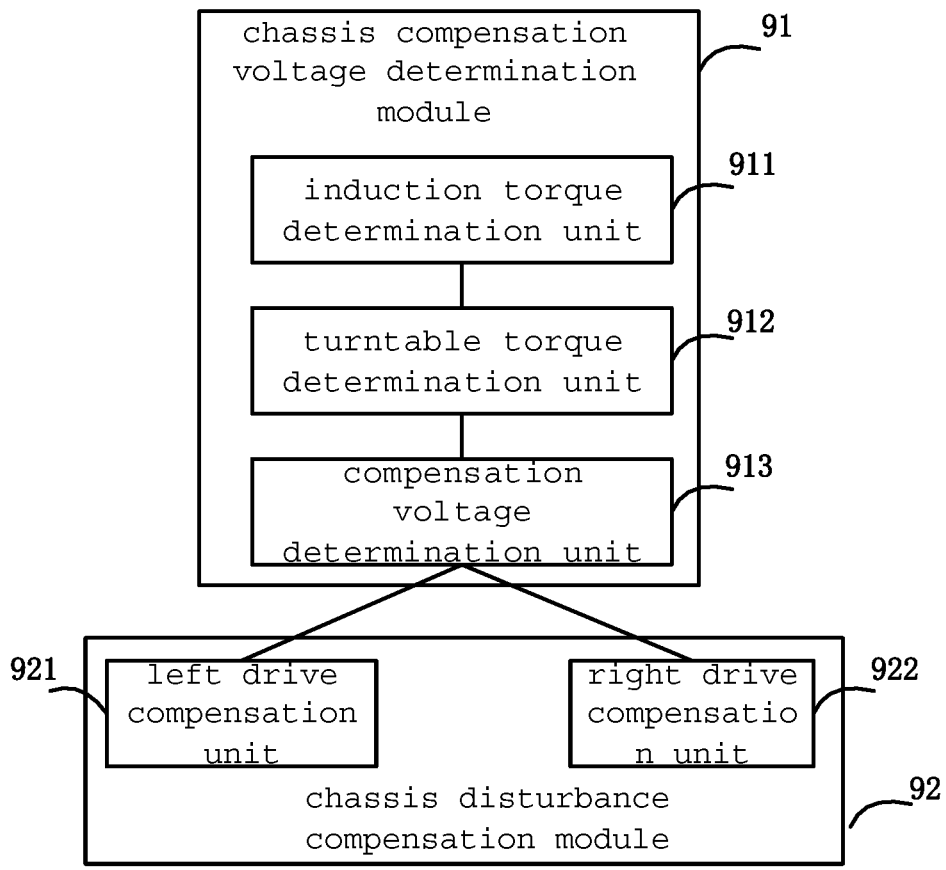
FIG. 10 is a schematic diagram of a control device for an AGV according to other embodiments of the present disclosure.

FIGS. 9-10 illustrate the use of a feedback signal in the turntable electromechanical control subsystem to compensate for a disturbance to the chassis electromechanical control subsystem. In this case, the first compensation voltage determination module is a chassis compensation voltage determination module 91, and the first disturbance compensation module is a chassis disturbance compensation module 92.

Figure 11:
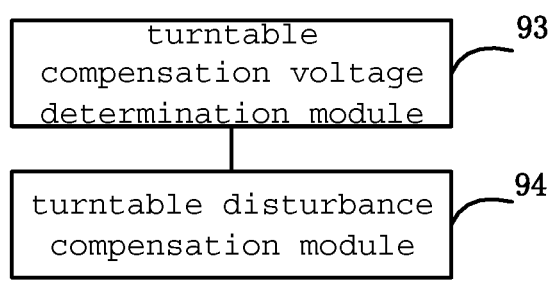
FIG. 11 is a schematic diagram of a control device for an AGV according to still other embodiments of the present disclosure.
Figure 12:
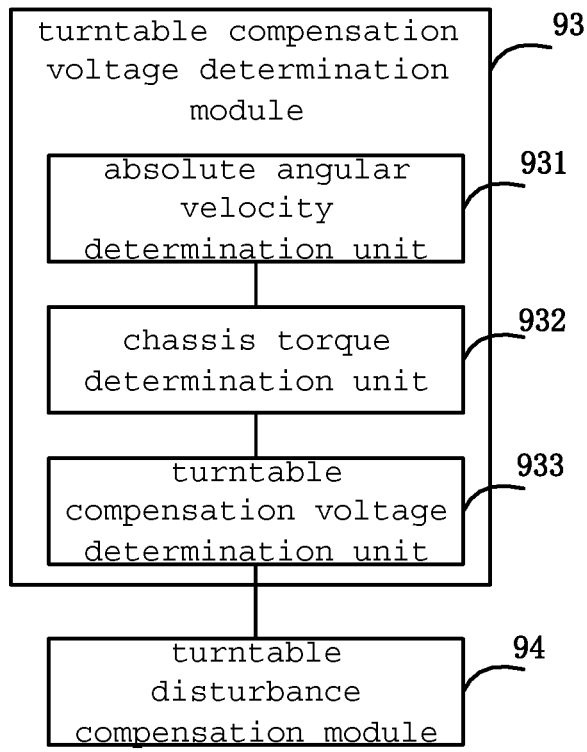
FIG. 12 is a schematic diagram of a control device for an AGV according to further embodiments of the present disclosure.

FIGS. 11-12 illustrate the use of a feedback signal in the chassis electromechanical control subsystem to compensate for a disturbance to the turntable electromechanical control subsystem. In this case, the first compensation voltage determination module is a turntable compensation voltage determination module 93, and the first disturbance compensation module is a turntable disturbance compensation module 94.

The control device may further compensate for a disturbance to the chassis electromechanical control subsystem using a feedback signal in the turntable electromechanical control subsystem in addition to compensating for a disturbance to the turntable electromechanical control subsystem using a feedback signal in the chassis electromechanical control subsystem. In this case, if the first compensation voltage determination module is a chassis compensation voltage determination module 91, the first disturbance compensation module is a chassis disturbance compensation module 92, the second compensation voltage determination module is a turntable compensation voltage determination module 93, and the second disturbance compensation module is a turntable disturbance compensation module 94; or if the first compensation voltage determination module is a turntable compensation voltage determination module 93, and the first disturbance compensation module is a turntable disturbance compensation module 94, the second compensation voltage determination module is a chassis compensation voltage determination module 91, and the second disturbance compensation module is a chassis disturbance compensation module 92.

FIG. 9 is a schematic diagram of a control device for an AGV according to some embodiments of the present disclosure. As shown in FIG. 9, the control device for an automated guided vehicle may comprise a chassis compensation voltage determination module 91 and a chassis disturbance compensation module 92.

The chassis compensation voltage determination module 91 is used for determining a chassis compensation voltage based on a feedback signal in a turntable electromechanical control subsystem.

The chassis disturbance compensation module 92 is used for compensating for a disturbance to the chassis electromechanical control subsystem using the chassis compensation voltage.

In some embodiments, the chassis disturbance compensation module 92 is used for compensating for an input voltage of an electromechanical module in the chassis electromechanical control subsystem by using the chassis compensation voltage. In a case where the chassis has a plurality of drive wheels, the input voltage of the electromechanical module of each drive wheel in the chassis electromechanical control subsystem is compensated by using the compensation voltage of the drive wheel.

In some embodiments, in the case where the chassis has a left drive wheel and a right drive wheel, the chassis compensation voltage comprises a compensation voltage of the left drive wheel and a compensation voltage of the right drive wheel.

Based on the control device for an automated guided vehicle provided in the above embodiment of the present disclosure, through utilizing the coupling relation between the turntable and the chassis, a disturbance to the chassis electromechanical control subsystem is compensated by using a feedback signal in the turntable electromechanical control subsystem, so that high-precision movement control of the turntable and the chassis is realized.

FIG. 10 is a schematic diagram of a control device for an AGV according to other embodiments of the present disclosure. Compared with the embodiment shown in FIG. 9, in FIG. 10, in the case where the chassis has, for example, a left drive wheel and a right drive wheel, the chassis disturbance compensation module 92 comprises a left drive compensation unit 921 and a right drive compensation unit 922.

The left drive compensation unit 921 is used for compensating for an input voltage of a left drive wheel electromechanical module in the chassis electromechanical control subsystem by using a compensation voltage of the left drive wheel.

The right drive compensation unit 922 is used for compensating for an input voltage of a right drive wheel electromechanical module in the chassis electromechanical control subsystem by using a compensation voltage of the right drive wheel.

Further, in the embodiment shown in FIG. 10, the chassis compensation voltage determination module 91 comprises an induction torque determination unit 911, a turntable torque determination unit 912, and a compensation voltage determination unit 913.

The induction torque determination unit 911 is used for determining an induction torque $\tau_g$ according to a feedback signal in the turntable electromechanical control subsystem.

In some embodiments, the feedback signal in the turntable electromechanical control subsystem is a turntable rotational angular velocity $\omega_g$.

The induction torque $\tau_g$ is directly proportional to a turntable rotational angular acceleration $d\omega_g/dt$. For example, the calculation can be performed using the above formula (1).

The turntable torque determination unit 912 is used for determining a torque $\tau_w$ applied to drive wheels of the chassis by the turntable according to the induction torque $\tau_g$.

In some embodiments, the torque $\tau_w$ is directly proportional to the induction torque $\tau_g$. For example, the calculation can be performed using the above formula (2).

The compensation voltage determination unit 913 is used for determining a compensation voltage u of each drive wheel of the chassis based on the torque $\tau_w$ and a rotational angular velocity of the drive wheel. In a case where the chassis has, for example, a left drive wheel and a right drive wheel, a compensation voltage $u_l$ of the left drive wheel is determined according to the torque $\tau_w$ and the rotational angular velocity $\omega_l$ of the left drive wheel, and a compensation voltage $u_r$ of the right drive wheel is determined according to the torque $\tau_w$ and the rotational angular velocity $\omega_r$ of the right drive wheel.

For example, the left-drive compensation voltage $u_l$ and the right-drive compensation voltage $u_r$ can be calculated using the above formulas (3) and (4).

FIG. 11 is a schematic diagram of a control device for an AGV according to still other embodiments of the present disclosure. The AGV control apparatus comprises or further comprises, on the basis of the embodiment shown in FIG. 9 or FIG. 10, a turntable compensation voltage determination module 93 and a turntable disturbance compensation module 94.

The turntable compensation voltage determination module 93 is used for determining a turntable compensation voltage according to a feedback signal in a chassis electromechanical control subsystem.

The turntable disturbance compensation module 94 is used for compensating for a disturbance to the turntable electromechanical control subsystem by using the turntable compensation voltage.

In some embodiments, the turntable disturbance compensation module 94 specifically compensates for an input voltage of a turntable electromechanical module in the turntable electromechanical control subsystem using the turntable compensation voltage.

FIG. 12 is a schematic diagram of a control device for an AGV according to further embodiments of the present disclosure. Compared with the embodiment shown in FIG. 11, in FIG. 12, the turntable compensation voltage determination module 93 comprises an absolute angular velocity determination unit 931, a chassis torque determination unit 932, and a turntable compensation voltage determination unit 933.

The absolute angular velocity determination unit 931 is used to determine an absolute angular velocity $\omega_c$ of rotation of the chassis according to a feedback signal in the chassis electromechanical control subsystem.

In some embodiments, the feedback signal in the chassis electromechanical control subsystem comprises a right drive wheel rotational angular velocity $\omega_r$ and a left drive wheel rotational angular velocity $\omega_l$ in the chassis electromechanical control subsystem.

Optionally, the absolute angular velocity $\omega_c$ is directly proportional to a difference between the right drive wheel rotational angular velocity $\omega_r$ and the left drive wheel rotational angular velocity $\omega_l$. For example, the absolute angular velocity $\omega_c$ can be calculated using the above formula (5).

The chassis torque determination unit 932 is used to determine a torque $\tau_c$ applied to the turntable by the chassis according to an absolute angular acceleration $d\omega_c/dt$ of rotation of the chassis.

Optionally, the torque $\tau_c$ is directly proportional to the absolute angular acceleration $d\omega_c/dt$ of rotation of the chassis. For example, the torque $\tau_c$ can be calculated using the above formula (6).

The turntable compensation voltage determination unit 933 is used to determine a turntable compensation voltage $u_g$ according to the torque $\tau_c$ and a rotational angular velocity $\omega_g$ of the turntable.

For example, the turntable compensation voltage $u_g$ can be calculated using the above formula (7).

The modules and units of the various embodiments described above can be implemented by a processor of a control device for an AGV to perform corresponding operations.

Figure 13:
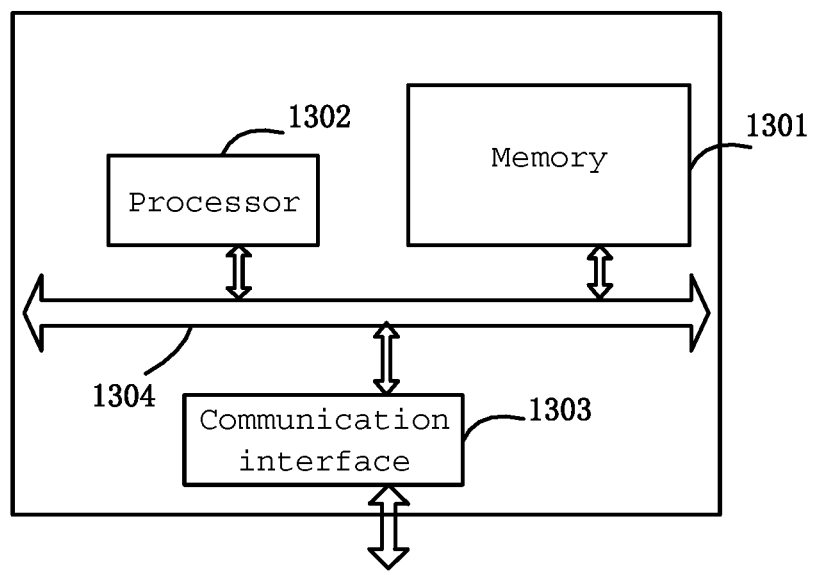
FIG. 13 is a schematic diagram of a control device for an AGV according to still further embodiments of the present disclosure.

FIG. 13 is a schematic diagram of a control device for an AGV according to still further embodiments of the present disclosure. As shown in FIG. 13, the AGV control device comprises memory 1301 and a processor 1302.

The memory 1301 is used to store computer instructions. The processor 1302 is coupled to the memory 1301, and is configured to carry out a method involved in any one of the embodiments of FIGS. 4, 5, 7, 8 based on computer instructions stored in the memory.

As shown in FIG. 13, the delivery robot control device further comprises a communication interface 1303 for performing information interaction with other devices. The device further comprises a bus 1304, wherein the processor 1302, the communication interface 1303, and the memory 1301 communicate with each other via the bus 1304.

The memory 1301 may comprise a high speed RAM memory, and may also comprise a non-volatile memory such as at least one disk storage device. The memory 1301 can also be a memory array. The memory 1301 may also be partitioned into blocks, which may be combined into virtual volumes according to a certain rule.

In addition, the processor 1302 may be a central processing unit (CPU), or may be an Application Specific Integrated Circuit (ASIC) or one or more integrated circuits configured to implement the embodiments of the present disclosure.

Figure 14:
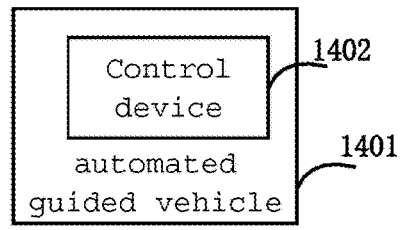
FIG. 14 is a schematic diagram of an automated guided vehicle according to some embodiments of the present disclosure.

FIG. 14 is a schematic diagram of an automated guided vehicle according to some embodiments of the present disclosure. As shown in FIG. 14, the automated guided vehicle 1401 comprises a control device 1402, wherein the control device 1402 is the control device for an AGV according to any one of the embodiments of FIGS. 9-13.

Furthermore, the present disclosure also relates to a computer readable storage medium, such as a non-volatile storage medium, the computer readable storage medium storing computer instructions, which when executed by a processor implement the method involved in any one of the embodiments of FIGS. 4, 5, 7, 8.

The AGV feedforward decoupling control of the present disclosure will be specifically described below with a specific example.

Figure 15:
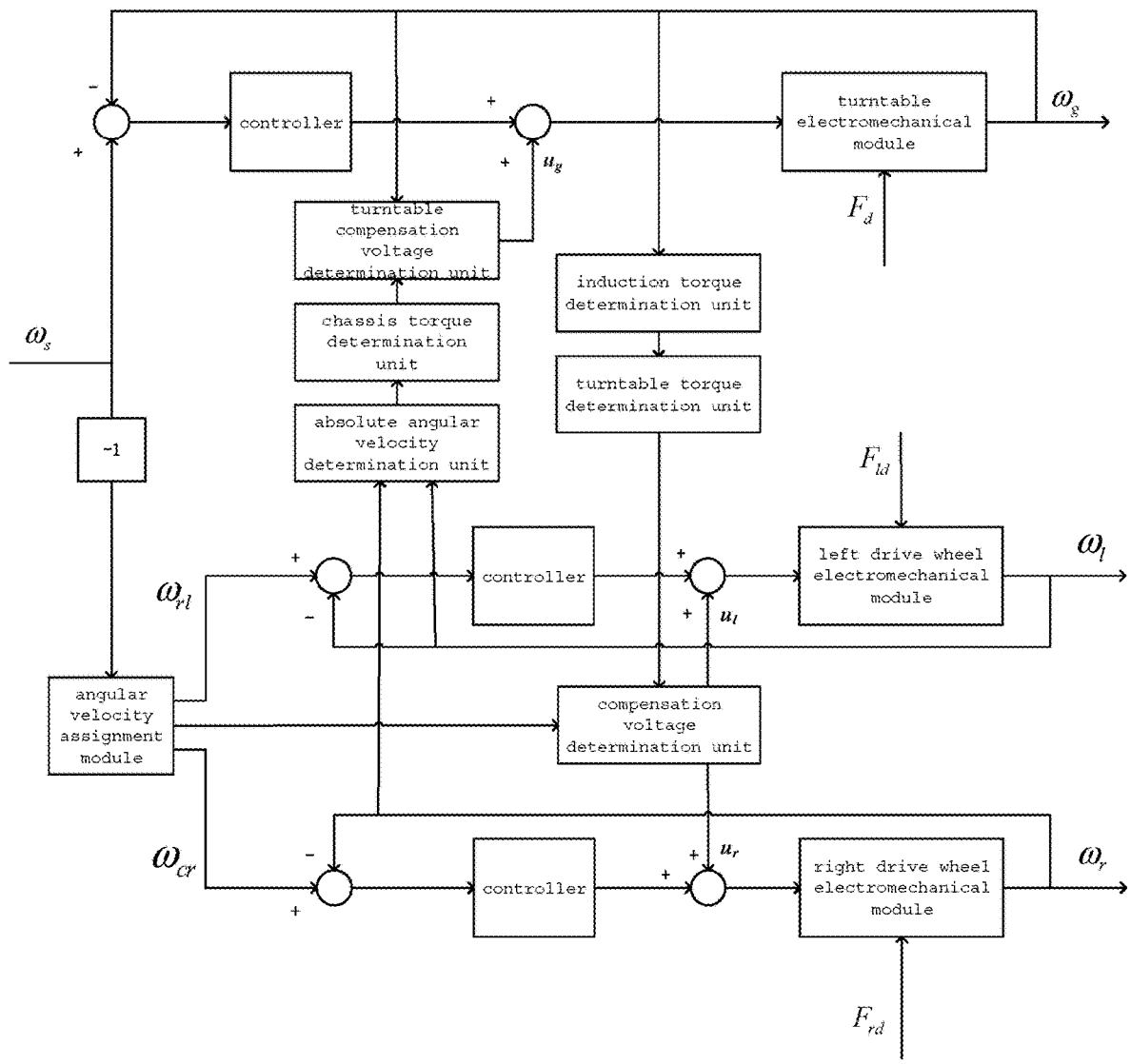
FIG. 15 is a schematic diagram of feedforward decoupling control of the automated guided vehicle according to some embodiments of the present disclosure.

As shown in FIG. 15, an induction torque determination unit 911 determines an induction torque $\tau_g$ according to a feedback signal $\omega_g$ in a turntable electromechanical control subsystem; a turntable acting torque determination unit 912 determines a torque w applied to a chassis drive wheel by a turntable according to the induction torque $\tau_g$; a compensation voltage determination unit 913 is used to determine a left-drive compensation voltage $u_l$ according to the torque $\tau_w$ and a rotational angular velocity $\omega_l$ of a left drive wheel, and determine a compensation voltage $u_r$ of the right drive wheel according to the torque $\tau_w$ and a rotational angular velocity $\omega_r$ of a right drive wheel. In a left drive control branch, the left drive compensation voltage $u_l$ is added to a voltage value output by a controller, and the obtained sum is supplied to a left drive wheel electromechanical module to control the rotational angular velocity $\omega_l$ of the left drive wheel. In a right drive control branch, the right drive compensation voltage $u_r$ is added to a voltage value output by a controller, and the obtained sum is supplied to a right drive wheel electromechanical module to control the rotational angular velocity $\omega_r$ of the right drive wheel.

In addition, an absolute angular velocity determination unit 931 determines an absolute angular velocity $\omega_c$ of rotation of the chassis according to a feedback signal in the chassis electromechanical control subsystem. The feedback signal in the chassis electromechanical control subsystem comprises a right drive wheel rotational angular velocity $\omega_r$ and a left drive wheel rotational angular velocity $\omega_l$ in the chassis electromechanical control subsystem. A chassis torque determination unit 932 determines a torque $\tau_c$ applied to the turntable by the chassis according to an absolute angular acceleration $d\omega_c/dt$ of rotation of the chassis. A turntable compensation voltage determination unit 933 determines a turntable compensation voltage $u_g$ according to the torque $\tau_c$ and a rotational angular velocity $\omega_g$ of the turntable. The turntable compensation voltage $u_g$ is added to a voltage value output by a controller, and the obtained sum is supplied to a turntable electromechanical module to control the turntable rotational angular velocity $\omega_g$.

The present disclosure couples the force exertion in the turntable electromechanical control subsystem to the force exertion in the chassis electromechanical control subsystem, and introduces a feedback amount from one subsystem to the other subsystem. By compensating an actual force disturbance in each subsystem, the high-precision control of the motion of the turntable and the motion of the chassis is realized.

One skilled in the art should understand that, the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above description of this invention is given for illustration and description but is not exhaustive and is not intended to limit the present invention to the form disclosed herein. Various modifications and variations are apparent for a person of ordinary skill in the art. Embodiments are selected and described for a better illustration of the principle and practical application of the present disclosure, so that those skilled in the art can understand the present disclosure and envisage various embodiments with various modifications suited to specific usages.

What is claimed is:

1. A control method for an automated guided vehicle, comprising:
   determining a first compensation voltage according to a feedback signal in a first control subsystem; and
   compensating for a disturbance to a second control subsystem by using the first compensation voltage,
   wherein the first control subsystem is one of a turntable electromechanical control subsystem and a chassis electromechanical control subsystem, and the second control subsystem is the other of the turntable electromechanical control subsystem and the chassis electromechanical control subsystem, and
   wherein when the first control subsystem is the turntable electromechanical control subsystem and the second control subsystem is the chassis electromechanical control subsystem, determining a first compensation voltage comprises:
      determining an induction torque $\tau_g$ according to a feedback signal in the turntable electromechanical control subsystem combined with a moment of inertia of a load and a moment of inertia of the chassis;
      determining a torque $\tau_w$ applied to drive wheels of the chassis by the turntable according to the induction torque $\tau_g$; and
      determining a compensation voltage u of each drive wheel of the chassis based on the torque $\tau_W$ and a rotational angular velocity ω of the drive wheel.

2. The control method according to claim 1, wherein compensating for a disturbance to a second control subsystem comprises:
   compensating for an input voltage of an electromechanical module in the second control subsystem by using the first compensation voltage.

3. The control method according to claim 2,
   wherein the chassis has a plurality of drive wheels, and the first compensation voltage comprises a compensation voltage of each drive wheel, and
   wherein compensating for a disturbance to a second control subsystem comprises:
      compensating for an input voltage of an electromechanical module of each drive wheel in the chassis electromechanical control subsystem by using the compensation voltage of the drive wheel.

4. The control method according to claim 1, wherein
   the feedback signal in the turntable electromechanical control subsystem is a turntable rotational angular velocity $\omega_g$; and
   the induction torque $\tau_g$ is directly proportional to a turntable rotational angular acceleration $d\omega_g/dt$.

5. The control method according to claim 1, wherein the torque $\tau_w$ is directly proportional to the induction torque $\tau_g$.

6. The control method according to claim 1, wherein the chassis has a left drive wheel and a right drive wheel, the compensation voltage $u_l$ of the left drive wheel being opposite to the compensation voltage $u_r$ of the right drive wheel.

7. The control method according to claim 1, wherein when the first control subsystem is the chassis electromechanical control subsystem and the second control subsystem is the turntable electromechanical control subsystem, determining a first compensation voltage comprises:
   determining an absolute angular velocity $\omega_c$ of rotation of the chassis according to a feedback signal in the chassis electromechanical control subsystem;
   determining a torque $\tau_c$ applied to the turntable by the chassis according to an absolute angular acceleration $d\omega_c/dt$ of rotation of the chassis; and
   determining a turntable compensation voltage $u_g$ according to the torque $\tau_c$ and a rotational angular velocity $\omega_g$ of the turntable.

8. The control method according to claim 7,
   wherein the chassis has a left drive wheel and a right drive wheel;
   wherein the feedback signal in the chassis electromechanical control subsystem comprises a right drive wheel rotational angular velocity $\omega_r$ and a left drive wheel rotational angular velocity $\omega_l$ in the chassis electromechanical control subsystem; and
   wherein the absolute angular velocity $\omega_c$ is directly proportional to a difference between the right drive wheel rotational angular velocity $\omega_r$ and the left drive wheel rotational angular velocity $\omega_l$.

9. The control method according to claim 7, wherein the torque $\tau_c$ is directly proportional to the absolute angular acceleration $d\omega_c/dt$ of rotation of the chassis.

10. The control method according to claim 1, further comprising:
    determining a second compensation voltage according to a feedback signal in the second control subsystem; and
    compensating for a disturbance to the first control subsystem by using the second compensation voltage.

11. A control device for an automated guided vehicle, comprising:
    memory for storing computer instructions; and
    a processor coupled to the memory, which is configured to execute the computer instructions that cause the control device to:

determine a first compensation voltage according to a feedback signal in a first control subsystem; and compensate for a disturbance to a second control subsystem by using the first compensation voltage, wherein the first control subsystem is one of a turntable electromechanical control subsystem and a chassis electromechanical control subsystem, and the second control subsystem is the other of the turntable electromechanical control subsystem and the chassis electromechanical control subsystem, and wherein when the first control subsystem is the turntable electromechanical control subsystem and the second control subsystem is the chassis electromechanical control subsystem, determine a first compensation voltage comprises:

determining an induction torque $\tau_g$ according to a feedback signal in the turntable electromechanical control subsystem combined with a moment of inertia of a load and a moment of inertia of the chassis;

determining a torque $\tau_w$ applied to drive wheels of the chassis by the turntable according to the induction torque $\tau_g$; and determining a compensation voltage u of each drive wheel of the chassis based on the torque $\tau_w$ and a rotational angular velocity ω of the drive wheel.

12. An automated guided vehicle, comprising the control device for the automated guided vehicle according to claim 11.

13. The control device according to claim 11,
wherein the chassis has a plurality of drive wheels, and the first compensation voltage comprises a compensation voltage of each drive wheel, and
wherein the computer instructions that cause the control device to:
compensate for an input voltage of an electromechanical module of each drive wheel in the chassis electromechanical control subsystem by using the compensation voltage of the drive wheel.

14. The control device according to claim 11, wherein when the first control subsystem is the chassis electromechanical control subsystem and the second control subsystem is the turntable electromechanical control subsystem, the computer instructions that cause the control device to:
determine an absolute angular velocity $\omega_c$ of rotation of the chassis according to a feedback signal in the chassis electromechanical control subsystem;
determine a torque $\tau_c$ applied to the turntable by the chassis according to an absolute angular acceleration $d\omega_c/dt$ of rotation of the chassis; and
determine a turntable compensation voltage $u_g$ according to the torque $\tau_c$ and a rotational angular velocity $\omega_g$ of the turntable.

15. A non-transitory computer-readable storage medium having stored therein computer instructions that, when executed by one or more processors of a computer system, cause the computer system to:
determine a first compensation voltage according to a feedback signal in a first control subsystem; and
compensate for a disturbance to a second control subsystem by using the first compensation voltage,
wherein the first control subsystem is one of a turntable electromechanical control subsystem and a chassis electromechanical control subsystem, and the second control subsystem is the other of the turntable electromechanical control subsystem and the chassis electromechanical control subsystem, and
wherein when the first control subsystem is the turntable electromechanical control subsystem and the second control subsystem is the chassis electromechanical control subsystem, determine a first compensation voltage comprises:
determining an induction torque $\tau_g$ according to a feedback signal in the turntable electromechanical control subsystem combined with a moment of inertia of a load and a moment of inertia of the chassis;
determining a torque $\tau_w$ applied to drive wheels of the chassis by the turntable according to the induction torque $\tau_g$; and
determining a compensation voltage u of each drive wheel of the chassis based on the torque $\tau_w$ and a rotational angular velocity ω of the drive wheel.

16. The storage medium according to claim 15,
wherein the chassis has a plurality of drive wheels, and the first compensation voltage comprises a compensation voltage of each drive wheel, and
wherein the computer instructions that cause the computer system to:
compensate for an input voltage of an electromechanical module of each drive wheel in the chassis electromechanical control subsystem by using the compensation voltage of the drive wheel.

17. The storage medium according to claim 15, wherein when the first control subsystem is the chassis electromechanical control subsystem and the second control subsystem is the turntable electromechanical control subsystem, the computer instructions that cause the computer system to:
determine an absolute angular velocity $\omega_c$ of rotation of the chassis according to a feedback signal in the chassis electromechanical control subsystem;
determine a torque $\tau_c$ applied to the turntable by the chassis according to an absolute angular acceleration $d\omega_c/dt$ of rotation of the chassis; and
determine a turntable compensation voltage $u_g$ according to the torque $\tau_c$ and a rotational angular velocity $\omega_g$ of the turntable.

* * * * *